US011300753B2

(12) United States Patent
Sato

(10) Patent No.: US 11,300,753 B2
(45) Date of Patent: Apr. 12, 2022

(54) LENS APPARATUS AND IMAGING APPARATUS INCLUDING THE SAME

(71) Applicant: CANON KABUSHIKI KAISHA, Tokyo (JP)

(72) Inventor: Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 16/533,502

(22) Filed: Aug. 6, 2019

(65) Prior Publication Data
US 2020/0049929 A1    Feb. 13, 2020

(30) Foreign Application Priority Data

Aug. 10, 2018 (JP) .............................. JP2018-151366

(51) Int. Cl.
| G02B 7/02 | (2021.01) |
| G03B 17/14 | (2021.01) |
| G02B 7/04 | (2021.01) |

(52) U.S. Cl.
CPC ............. *G02B 7/023* (2013.01); *G02B 7/025* (2013.01); *G02B 7/04* (2013.01); *G03B 17/14* (2013.01)

(58) Field of Classification Search
CPC .......... G02B 7/023; G02B 7/025; G02B 7/04; G02B 7/003; G02B 7/026; G02B 7/021; G02B 7/102; G02B 7/02; G02B 7/08; G02B 7/00; G03B 17/14; G03B 2205/0046
USPC ....................................................... 359/823
See application file for complete search history.

(56) References Cited

U.S. PATENT DOCUMENTS

| 2001/0015859 A1* | 8/2001 | Nomura ................. G02B 7/102 359/701 |
| 2003/0219243 A1* | 11/2003 | Tanaka .................. G02B 7/102 396/72 |

FOREIGN PATENT DOCUMENTS

| JP | 2013003452 | * | 1/2013 | ............... G02B 7/04 |
| JP | 2013-083694 A | | 5/2013 | |
| JP | 2015-158629 A | | 9/2015 | |
| JP | 5822558 A | | 11/2015 | |
| JP | 2017034900 | * | 2/2017 | ............... G02B 7/04 |
| JP | 2018-028629 A | | 2/2018 | |

OTHER PUBLICATIONS

Machine Translation of JP2013083694 (Year: 2013).*

(Continued)

*Primary Examiner* — Darryl J Collins
*Assistant Examiner* — Matthew Y Lee
(74) *Attorney, Agent, or Firm* — Canon U.S.A., Inc. I.P. Division

(57) ABSTRACT

A lens apparatus includes a base member including a rectilinear guide groove portion, a cam barrel including a cam groove portion, a lens holding member provided with a roller member inserted into the rectilinear guide groove portion and the cam groove portion and configured to support a lens unit, a first light amount adjustment unit, a biasing member configured to bias the roller member to the cam groove portion, and a pressing member provided between the first light amount adjustment unit and the lens holding member and configured to press the biasing member, wherein the first light amount adjustment unit includes a rotation regulating portion configured to regulate rotation of the pressing member around an optical axis of the lens unit.

6 Claims, 7 Drawing Sheets

(56) References Cited

OTHER PUBLICATIONS

Machine Translation of JP2017034900 (Year: 2017).*
Machine Translation of JP2013003452 (Year: 2013).*
Original Document JP2017034900 (Year: 2017).*
Original Document JP2013003452 (Year: 2013).*

* cited by examiner

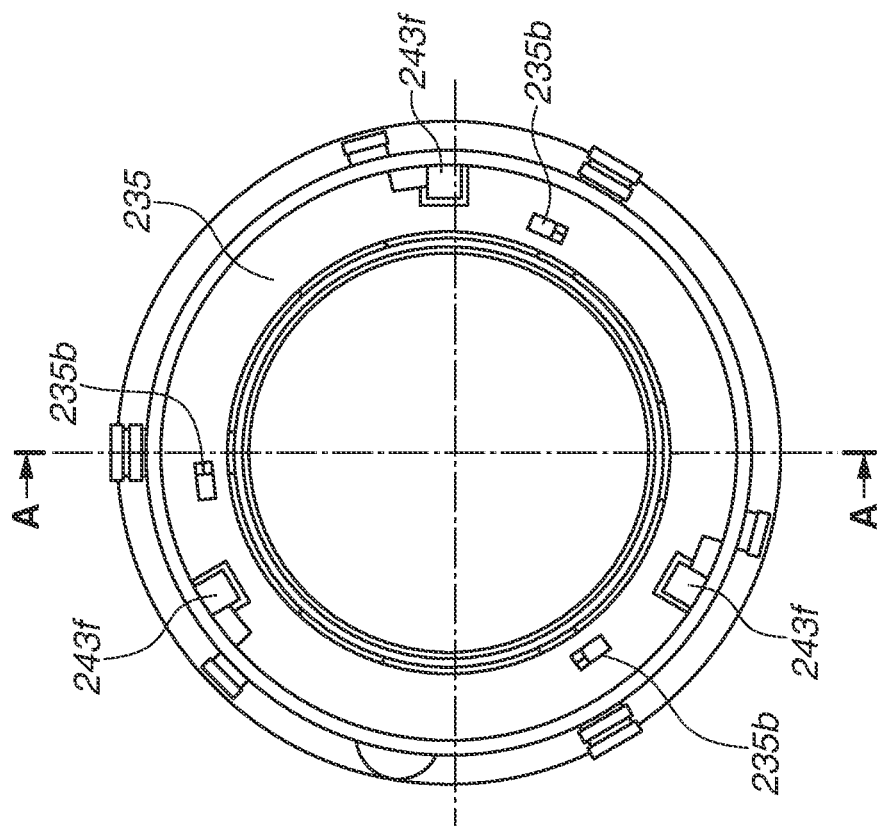
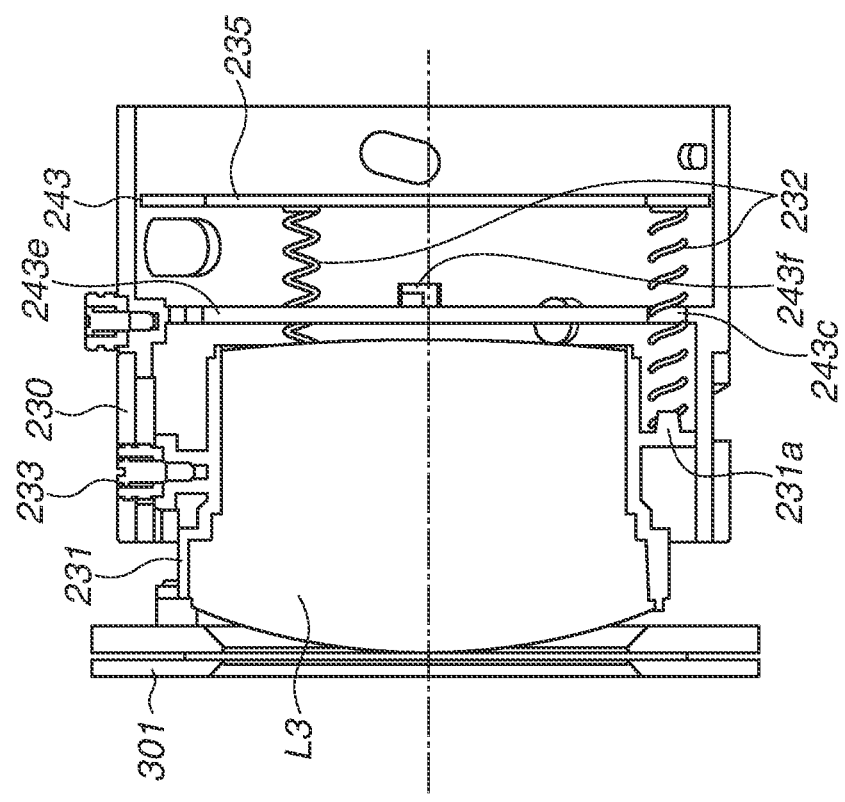

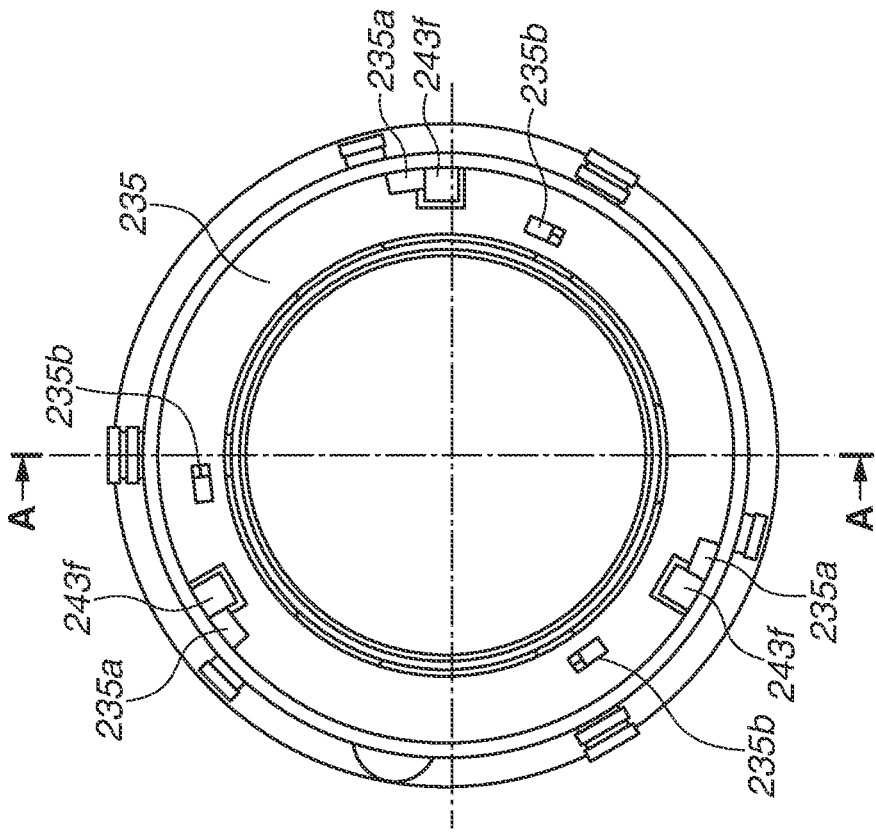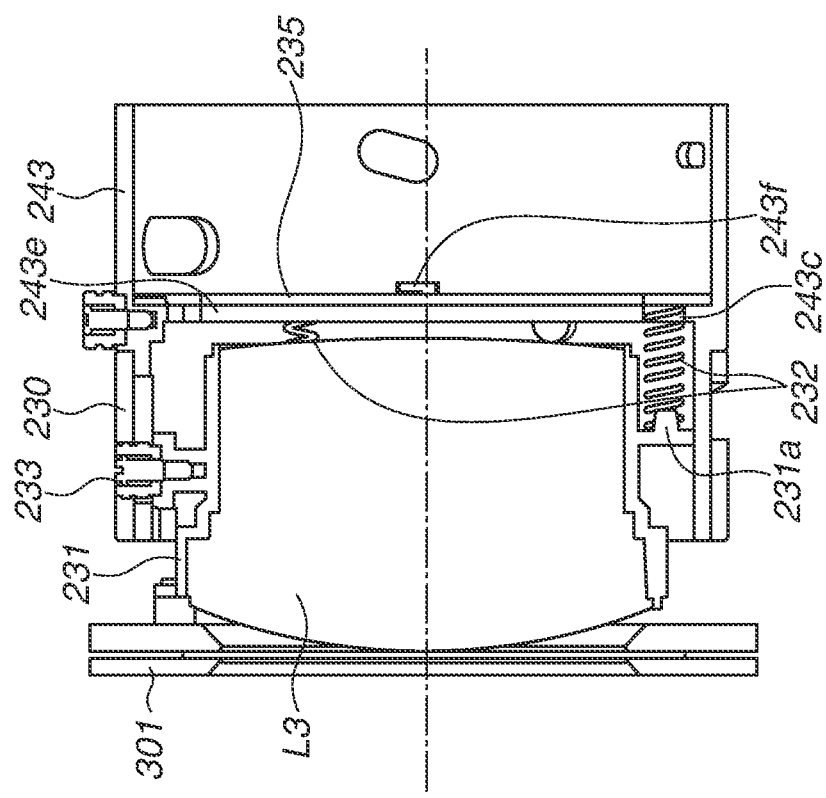

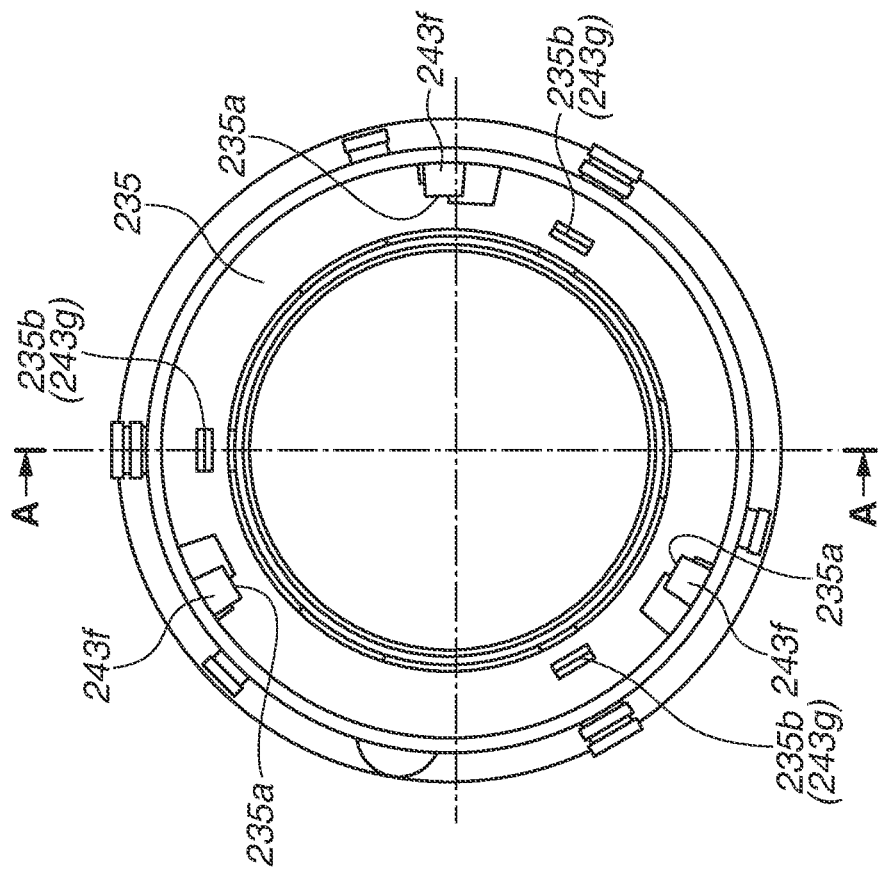
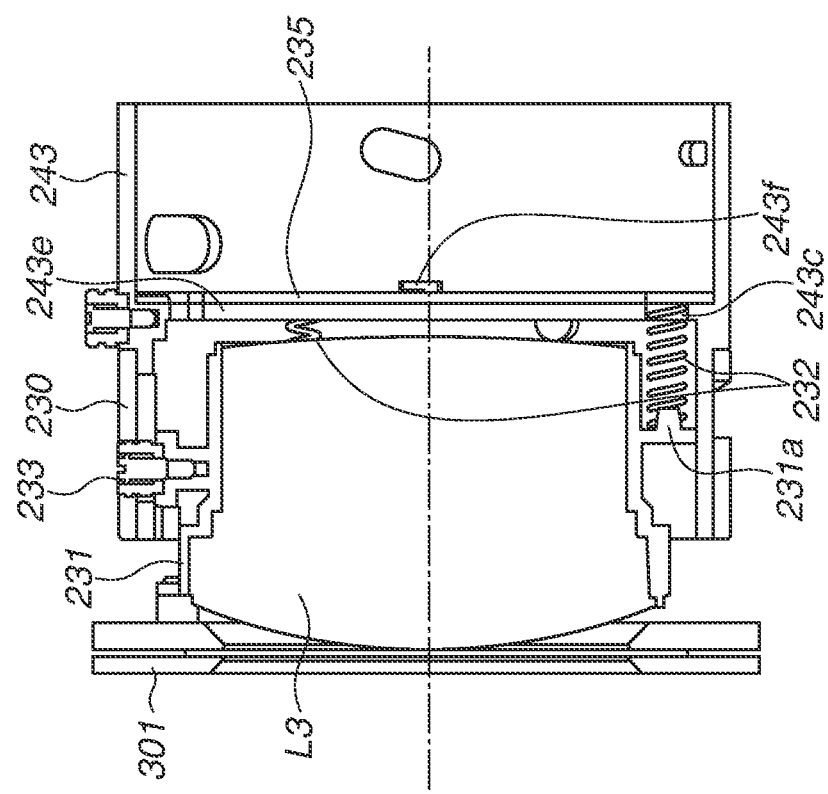

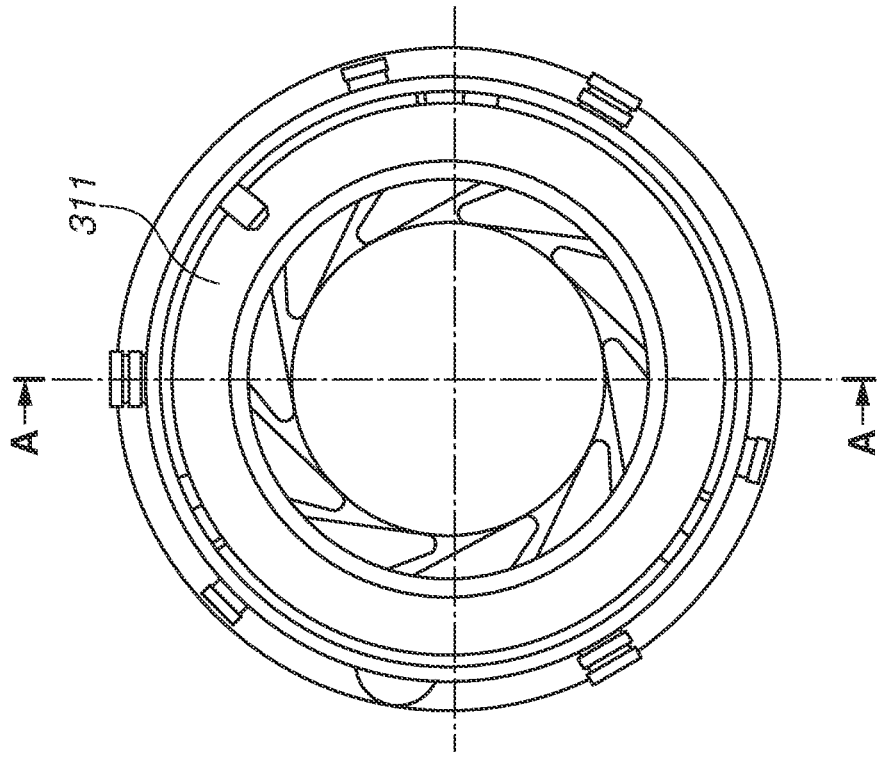
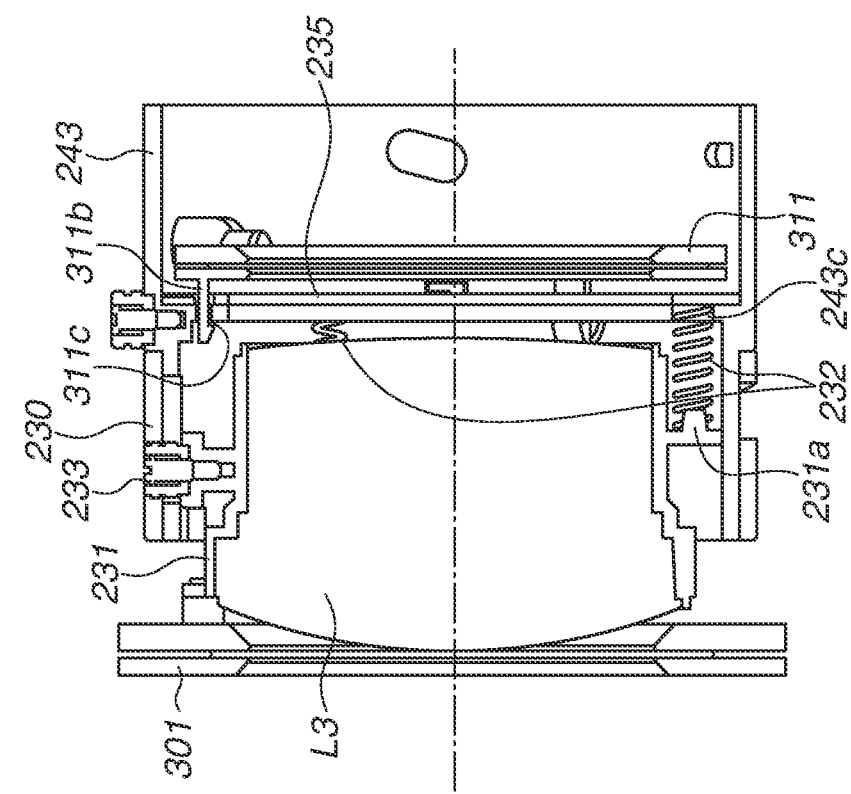

LENS APPARATUS AND IMAGING APPARATUS INCLUDING THE SAME

BACKGROUND OF THE INVENTION

Field of the Invention

The present disclosure relates to a lens apparatus and an imaging apparatus including the lens apparatus.

Description of the Related Art

When the orientation of the lens apparatus included in a digital camera (image capturing apparatus) changes, a position of an internal lens changes, and the optical performance changes depending on the orientation of the lens apparatus. The lens apparatus discussed in Japanese Patent No. 5822558 has a biasing member for biasing a lens holding member for supporting a lens unit in an optical axis direction. In the lens apparatus discussed in Japanese Patent No. 5822558, a roller member provided in the lens holding member is always biased by the biasing member in a fixed direction with respect to a cam groove. This suppresses a change in optical performance due to the orientation change of the lens apparatus described above.

In the lens apparatus discussed in Japanese Patent No. 5822558, an elastic member is provided between two barrel members having the lens unit therein. Thus, the two barrel members having the lens unit therein are always loaded by the elastic member.

In order to reduce this load, it is conceivable to bring one end of the biasing member into contact with a pressing member different from the barrel members. When the pressing member is rotated, the biasing member will be twisted. Accordingly, a rotation regulating member is required to suppress the rotation of the pressing member.

However, it is not preferable to provide a rotation regulating member in the lens apparatus in addition to the pressing member because the lens apparatus would increase in size.

SUMMARY OF THE INVENTION

The present disclosure is directed to a compact lens apparatus that of suppresses a change in optical performance due to a change in orientation, and an imaging apparatus including the same.

According to an aspect of the present disclosure, a lens apparatus includes a base member including a rectilinear guide groove portion, a cam barrel including a cam groove portion, a lens holding member provided with a roller member inserted into the rectilinear guide groove portion and the cam groove portion and configured to support a lens unit, a first light amount adjustment unit, a biasing member configured to bias the roller member to the cam groove portion, and a pressing member provided between the first light amount adjustment unit and the lens holding member and configured to press the biasing member, wherein the first light amount adjustment unit includes a rotation regulating portion configured to regulate rotation of the pressing member around an optical axis of the lens unit.

Further features of the present disclosure will become apparent from the following description of exemplary embodiments with reference to the attached drawings.

BRIEF DESCRIPTION OF THE DRAWINGS

FIGS. 3A and 3B are diagrams illustrating the biasing structure and the assembly procedure of the lens holder according to the exemplary embodiment of the present disclosure.

FIGS. 4A and 4B are diagrams illustrating the biasing structure and the assembly procedure of the lens holder according to the exemplary embodiment of the present disclosure.

FIGS. 5A and 5B are diagrams illustrating the biasing structure and assembly procedure of the lens holder according to the exemplary embodiment of the present disclosure.

FIGS. 5A and 5B are diagrams illustrating the biasing structure and the assembly procedure of the lens holder according to the exemplary embodiment of the present disclosure.

DESCRIPTION OF THE EMBODIMENTS

<Configuration of Imaging Apparatus=

Figure 7:
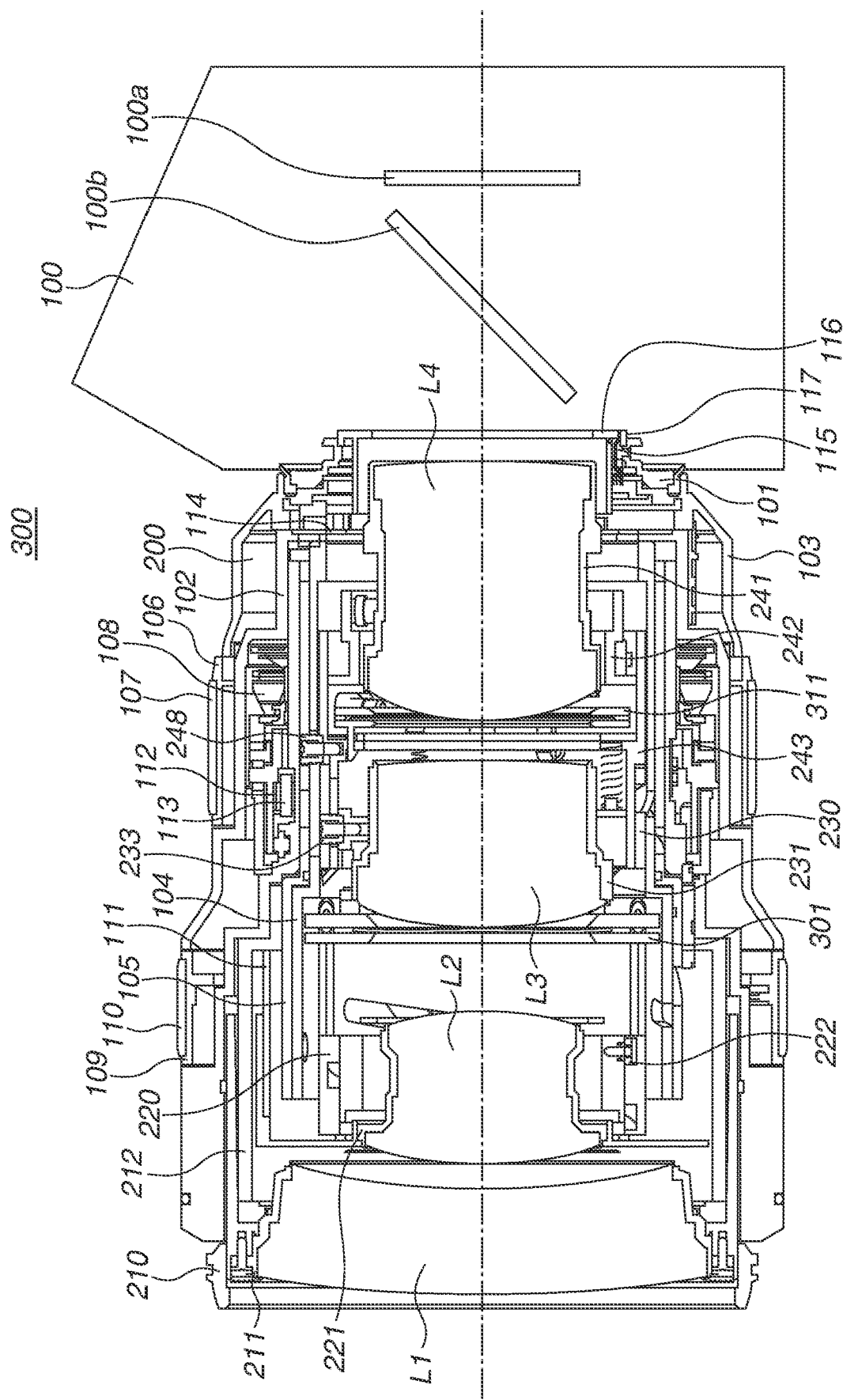
FIG. 7 is a cross-sectional view of a lens apparatus including an exemplary embodiment of the present disclosure and a camera body.

FIG. 7 is a diagram illustrating an imaging apparatus (camera system) 300 according to an exemplary embodiment. The imaging apparatus 300 is a digital single-lens camera including an interchangeable lens (lens apparatus) 200 and a camera body 100. Although the interchangeable lens 200 is mountable to and demountable from the camera body 100, the internal configuration of the interchangeable lens 200 may be applied to a lens apparatus included in an imaging apparatus in which a lens apparatus and a camera body are integrated.

<Configuration of Camera Body 100>

The camera body 100 includes an image sensor 100a such as a charge-coupled device (CCD) sensor or complementary metal oxide semiconductor (CMOS) sensor for receiving light through the interchangeable lens 200, and a quick-return mirror 100b. The internal configuration of the interchangeable lens 200 may be applied to a lens apparatus that is attachable to a camera body that does not include the quick-return mirror 100b.

<Configuration of Interchangeable Lens 200>

The interchangeable lens 200 includes a variable power optical system configured of 4 units. More specifically, the interchangeable lens 200 includes a first lens unit L1, and a second lens unit L2 that performs an focusing operation (focusing) by moving back and forth in an optical axis direction, a third lens unit L3, and a fourth lens unit L4. The first lens unit L1, the second lens unit L2, the third lens unit L3, and the fourth lens unit L4 move back and forth in the optical axis direction to perform a magnification operation (zooming). The lens unit described here includes a plurality of lenses and a single lens. The first to fourth lens units L1 to L4 are configured so as to change the distance between the adjacent lens units in the magnification operation. In other words, the boundaries between the lens units are within the distance between the lenses that changes during the magnification operation. Alternatively, a plurality of lenses held inside one lens holding member may be defined as a lens unit.

A mount 101 has a bayonet claw portion for attaching to the camera body 100, and is screwed and fixed to a fixed barrel 102. The fixed barrel 102 has a scale window and an SW panel (not illustrated). Switching a switch provided on the SW panel makes it possible to select and use a function such as automatic focusing.

An exterior ring 103 is sandwiched and fixed between the mount 101 and the fixed barrel 102.

A guide barrel 104 is fixed indirectly to the camera body 100 by being screwed and fixed to the fixed barrel 102. A cam barrel 105 is fitted to the outer periphery of the guide barrel 104 so as to be rotatable around the optical axis by a fourth-unit roller (roller member) 248, and a first unit roller, an inner cam roller, and a third-unit cam barrel roller (not illustrated) and fixed at a position as seen in the optical axis direction. With this configuration, when the cam barrel 105 is rotated, the intersection point between a guide groove portion (rectilinear guide groove portion) provided in the guide barrel 104 and extending in the optical axis direction and a cam groove portion provided in the cam barrel 105, is moved. By the movement of the intersection point, lens holding members supporting the lens units can be moved in the optical axis direction via the roller members.

A bayonet claw portion is provided on the outer periphery of the front end portion of a filter frame 210, and a screw portion is provided on the inner periphery thereof, so that accessories such as a hood and a filter can be attached to these portions.

A first-unit holding frame (first-lens holding member) 211 supporting the first lens unit L1 is screwed and fixed to the filter frame 210. The contact portions of the filter frame 210 and the first-unit holding frame 211 are each formed in a slope surface shape extending in a circumferential direction. Accordingly, rotating and attaching the first-unit holding frame 211 to the filter frame 210 makes it possible to select the attachment position of the first-unit holding frame 211 to the filter frame 210 in the optical axis direction. This allows correction of a shift in the focal position between the wide-angle side and the telephoto side due to manufacturing error.

The filter frame 210 is screwed and fixed to a rectilinear barrel A roller (not illustrated) is screwed and fixed to the rectilinear barrel 212.

A fourth-unit holding frame (fourth-lens holding member) 241 supporting the fourth lens unit L4 is supported by a fourth-unit adjustment barrel 242. The fourth-unit adjustment barrel 242 is supported by a fourth-unit base 243. The above-described fourth-unit roller 248 is screwed and fixed to the fourth-unit base 243. The fourth-unit roller 248 engages with the guide groove portion provided in the guide barrel 104 and extending in the optical axis direction and the cam groove portion provided in the cam barrel 105. In other words, the fourth-unit roller 248 as a roller member is inserted in the guide groove portion and the cam groove portion. The same applies to roller members other than the fourth-unit roller 248. Herein, the engagement of the fourth-unit roller 248 as a roller member or a cam follower with the guide groove portion and the cam groove portion does not mean only that different two portions on the side circumferential surface of the roller member are in contact with the guide groove portion and the cam groove portion. The engagement also means that the roller member is inserted in the guide groove portion and the cam groove portion and one portion on the side circumferential surface of the roller member is in contact with the guide groove portion and the cam groove portion.

When the cam barrel 105 rotates with respect to the guide barrel 104, the intersection point between the guide groove and the cam groove moves, whereby the fourth-unit roller 248 moves in the optical axis direction. Accordingly, the fourth lens unit L4 moves in the optical axis direction integrally with the fourth-unit base 243. A sub diaphragm (second light amount adjustment unit) 311 is elastically coupled to the inner diameter of the fourth-unit base 243 in front of the fourth-unit adjustment barrel 242. The sub diaphragm 311 is for determining the aperture and cutting unnecessary light.

Figure 1:
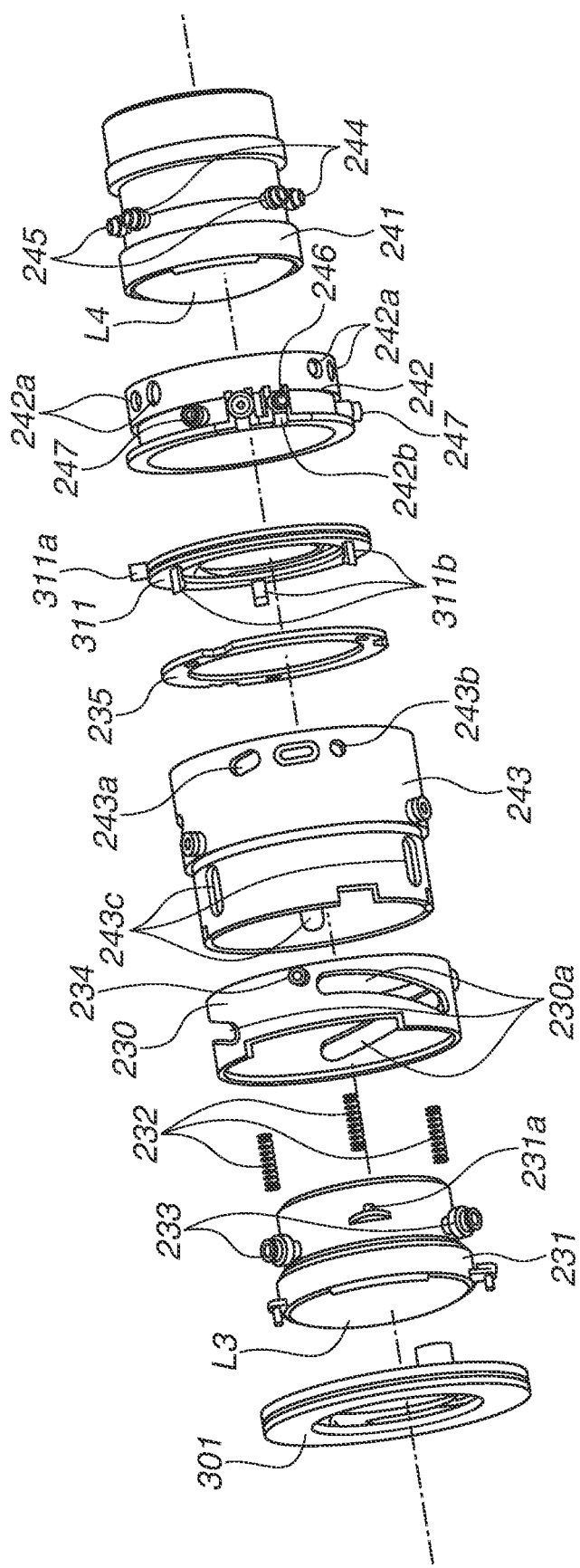
FIG. 1 is an exploded perspective view of third and fourth lens unit holders according to an exemplary embodiment of the present disclosure.

A third-unit cam barrel 230 is fitted to the outer periphery of the fourth-unit base 243 so as to be rotatable around the optical axis by third-unit rollers (roller members) 233 and fixed at a position in the optical axis direction. A third-unit cam barrel roller 234 illustrated in FIG. 1 is screwed and fixed to the third-unit cam barrel 230 and is engaged with the cam groove portion provided in the guide barrel 104.

Third-unit rollers 233 are screwed and fixed to a third-unit holding frame 231 that supports the third lens unit L3. The third-unit rollers 233 are engaged with a guide groove portion provided in the fourth-unit base 243 in the optical axis direction and a cam groove portion provided in the third-unit cam barrel 230. Therefore, when the third-unit cam barrel 230 rotates with respect to the fourth-unit base 243, the intersection point between the guide groove and the cam groove moves, whereby the third-unit rollers 233 move in the optical axis direction. This changes the distance between the fourth lens unit L4 supported by the fourth-unit base 243 and the third lens unit L3 supported by the third-unit holding frame 231.

In addition, when the cam barrel 105 rotates with respect to the guide barrel 104, the fourth-unit base 243 and the third-unit cam barrel 230 move in the optical axis direction. Accordingly, the third-unit holding frame 231 moves in the optical axis direction, in a state of being supported by the third-unit rollers 233 at the fourth-unit base 243 and the third-unit cam barrel 230. The third lens unit L3 also moves by this operation.

An electromagnetic diaphragm unit (main diaphragm or first light amount adjustment unit) 301 including a diaphragm driving portion and a diaphragm blade portion is screwed and fixed to the front of the third-unit holding frame 231.

A zoom operation ring 106 can rotate around the optical axis by engagement of a roller (not illustrated) with a groove portion provided in the circumferential direction in a state where movement in the optical axis direction is regulated. A zoom rubber 107 is wound around the outer periphery of the zoom operation ring 106. A zoom key (not illustrated) is screwed to the inner periphery of the zoom operation ring 106 and is engaged with a concave portion provided in the cam barrel 105. Thus, the cam barrel 105 can be rotated integrally with the zoom operation ring 106 via the zoom key.

A zoom brush (not illustrated) screwed and fixed to the zoom operation ring 106 slides on a gray code pattern on an encoder flexible substrate to detect the positional relationship between the zoom operation ring 106 and the encoder flexible substrate. In other words, the zoom brush (not illustrated) screwed and fixed to the zoom operation ring 106 is used to detect the amount of rotation of the zoom operation ring 106.

A focus unit 108 is screwed and fixed to the guide barrel 104. The focus unit 108 includes a vibration type motor and an operation mechanism. The focus unit 108 outputs the amount of rotation of a focus key 111 corresponding to the amount of rotation of the rotor of the vibration type motor and the amount of rotation of a focus operation ring 109. A focus rubber 110 is wound around the outer periphery of the focus operation ring 109.

In addition, a scale substrate 112 is attached to the inner periphery of an extension portion extending from the focus unit 108 in an arc shape. The amount of rotation of the focus key 111 due to the focus operation is detected by a position detection sensor 113 arranged to oppose the scale substrate 112. The outer peripheral side of the focus unit 108 has a protrusion in the phase where the encoder flexible substrate is not provided. A roller (not illustrated) is screwed and fixed to this protrusion.

An inner cam barrel roller (not illustrated) is screwed and fixed to an inner cam barrel 220. The inner cam barrel roller engages with a cam groove portion provided in the guide barrel 104 and a guide groove portion provided in the cam barrel 105 and extending in the optical axis direction. Therefore, the inner cam barrel 220 advances and retracts in the optical axis direction while rotating integrally with the cam barrel 105.

A second-unit roller 222 attached to the outer periphery of a second-unit holding frame (second lens holding member) 221 supporting the second lens unit L2 engages with a cam groove portion provided in the inner circumference of the inner cam barrel 220. A key portion extending from the second-unit holding frame 221 engages with the focus key 111 so as to rotate integrally. Therefore, when the cam barrel 105 rotates (the focus key 111 stops), the second-unit holding frame 221 advances or retracts in the optical axis direction by the total amount of the advancement and retraction amount of the inner cam barrel 220 in the optical axis direction and the amount of change of the engagement point in the optical axis direction along with the rotation of the cam groove portion in the inner cam barrel 220. Further, when the focus key 111 rotates (the cam barrel 105 stops), the second-unit holding frame 221 rotates and advances or retracts corresponding to the amount of change in the optical axis direction of the engagement point with the cam groove portion in the inner cam barrel 220.

In the interchangeable lens 200, these mechanisms mechanically advances and retracts the second lens unit L2 in the optical axis direction while correcting the focal position displacement caused by the change in focal length in the inner focus system.

A main substrate 114 is electrically connected to the focus unit 108, the electromagnetic diaphragm unit 301, and the encoder flexible substrate via the flexible substrate or in a direct manner to perform various controls.

A contact block 115 is screwed and fixed to the mount 101 and is connected to the main substrate 114 via the flexible substrate. The contact block 115 is provided to communicate with the camera body 100 and supply power to the camera body 100. A rear cover 116 is elastically coupled to the mount 101 to cut unnecessary light. A protective rubber ring 117 is elastically coupled to the rear cover 116.

<Zooming>

In the interchangeable lens 200 configured as described above, when the zoom operation ring 106 is rotated, the cam barrel 105 rotates via the zoom key, and all the lens units advance or retract in the optical axis direction by the above-described mechanisms to change magnification. At this time, the third-unit cam barrel 230 advances and retracts in the optical axis direction integrally with the fourth-unit base 243. When, the third-unit cam barrel roller (not illustrated) screwed and fixed to the third-unit cam barrel 230 rotates along the cam groove portion provided in the guide barrel 104, the third-unit cam barrel 230 rotates around the optical axis with respect to the fourth-unit base 243. As a result, the third-unit holding frame 231 supporting the third lens unit L3 is driven in the optical axis direction. With the advancement and retraction of the fourth-unit base 243 in the optical axis direction, a sub diaphragm roller 311a of the sub diaphragm 311 is engaged with and driven by the cam groove portion provided in the guide barrel 104, thereby to open or close the lens unit. The sub diaphragm 311 includes a diaphragm base plate having a plurality of diaphragm blades and a plurality of grooves for rotating the diaphragm blades. When the sub diaphragm roller 311a of the sub diaphragm 311 is engaged with and driven by the cam groove portion provided in the guide barrel 104 by advancement or retraction of the fourth-unit base 243 in the optical axis direction, the diaphragm base also rotates along with the rotation of the sub diaphragm roller 311a. This changes the diameter of the opening formed by the plurality of diaphragm blades.

<Focusing>

At the time of manual focusing, the amount of rotation of the focus operation ring 109 is detected. The focus unit 108 rotates the focus key based on the detection result, whereby the second lens unit L2 as the focusing unit can advance or retract in the optical axis direction to achieve in-focus state.

At the time of automatic focusing, the focus unit 108 rotates the focus key based on a signal from the camera body 100, whereby the second lens unit L2 as the focusing unit can advance or retract in the optical axis direction to achieve in-focus state.

<Structure for Optical Adjustment>

Next, a structure for performing optical adjustment in the third lens unit L3 and the fourth lens unit L4 will be described with reference to FIG. 1.

FIG. 1 is an exploded perspective view of the structure of the third lens unit L3, the fourth lens unit L4, and their vicinities in the interchangeable lens 200. The fourth-unit holding frame 241 supporting the fourth lens unit L4 is supported by a fourth-unit adjustment barrel 242 via three fourth-unit parallel adjustment rollers 244 and three fourth-unit tilt adjustment rollers 245 that are equally spaced around the optical axis at approximately 120 degrees. The fourth-unit adjustment barrel 242 is supported by the fourth-unit base 243 via a fourth-unit thrust adjustment roller 246 and three fourth-unit adjustment barrel rollers 247 that are equally spaced around the optical axis at approximately 120 degrees.

<Optical Adjustment of Decentering and Tilting of Fourth Lens Unit L4>

The fourth-unit parallel adjustment rollers 244 and the fourth-unit tilt adjustment rollers 245 have a cylindrical portion eccentric to the central axis of a screw fixed to the fourth-unit holding frame 241. Each of the cylindrical portions is engaged with a fourth-unit adjustment barrel long hole 242a that is provided in the fourth-unit adjustment barrel 242. Thus, when the fourth-unit parallel adjustment rollers 244 and the fourth-unit tilt adjustment rollers 245 are rotated around the screw central axis, the fourth-unit parallel adjustment rollers 244 and the fourth-unit tilt adjustment rollers 245 change in axis position with respect to the fourth-unit adjustment barrel long holes 242a. As a result, by changing the relative position of the fourth-unit holding frame 241 with respect to the fourth-unit adjustment barrel 242, the eccentricity and tilting of the optical axis of the fourth lens unit L4 is optically adjusted with respect to the fourth-unit adjustment barrel 242. The optical adjustment of eccentricity here refers to adjusting the position of the lens in a cross section orthogonal to the optical axis. The optical adjustment of tilting refers to adjusting the orientation of the lens in a cross section including the optical axis.

<Optical Adjustment of Fourth Lens Unit L4 in Front-Rear Direction of Optical Axis>

The fourth-unit adjustment barrel rollers 247 are engaged with fourth-unit base cam groove portions 243a provided in the fourth-unit base 243. The fourth-unit thrust adjustment roller 246 is supported in a fourth-unit base round hole 243b provided in the fourth-unit base 243. The fourth-unit thrust adjustment roller 246 has a cylindrical portion (eccentric portion) eccentric to the central axis of the fourth-unit base round hole 243b. The cylindrical portion engages with a fourth-unit adjustment barrel roller receiving portion 242b in the fourth-unit adjustment barrel 242. Thus, when the fourth-unit thrust adjustment roller 246 is rotated around the central axis of the fourth-unit base round hole 243b, the relative position of the fourth-unit adjustment barrel roller receiving portion 242b changes with respect to the fourth-unit base round hole 243b. As a result, by moving the fourth-unit adjustment barrel rollers 247 along the fourth-unit base cam groove portions 243a, the fourth-unit adjustment barrel 242 moves in the optical axis direction with respect to the fourth-unit base 243. Since the fourth-unit holding frame 241 is supported by the fourth-unit adjustment barrel 242, the position of the fourth lens unit L4 as seen in the optical axis direction changes relatively to the fourth-unit base 243, thereby performing an optical adjustment in the front-back direction of the optical axis.

The fourth-unit base 243 includes third-unit guide groove portions 243d. The third-unit cam barrel 230 includes third-unit cam groove portions 230a. The third-unit holding frame (third lens holding member) 231 holding the third lens unit L3 is supported by the third-unit rollers 233 engaging with the third-unit guide groove portions 243d and the third-unit cam groove portions 230a. In other words, the interchangeable lens 200 has no structure for changing the absolute position or orientation of the third lens unit L3. Accordingly, the relative position of the third lens unit L3 and the fourth lens unit L4 is changed by decentering, tilting, and adjusting the position of the fourth-unit holding frame 241 in the optical axis direction with respect to the fourth-unit base 243 as described above. In this way, optical adjustment is possible to obtain target optical performance.

Further, in the assembly process of the interchangeable lens 200, after performing the above-described optical adjustment, bonding with an adhesive the fourth-unit holding frame 241 and the fourth-unit adjustment barrel 242, or the fourth-unit adjustment barrel 242 and the fourth-unit base 243 makes it possible to reduce the displacement due to impact or vibration. As the adhesive, an ultraviolet curing adhesive, an epoxy based adhesive, an acrylic based adhesive, and the like can be used.

<Structure for Biasing>

Next, with reference to FIGS. 2A to 6B, a biasing structure for suppressing a change in optical performance due to an orientation change, and an assembly procedure of the biasing structure will be described.

Figure 2B:
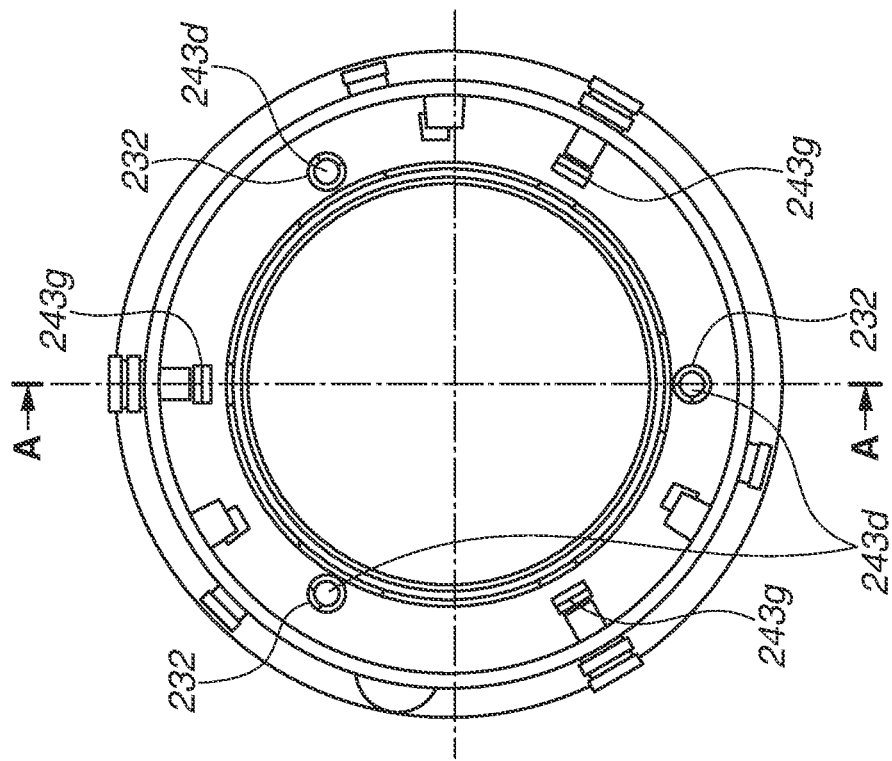
FIGS. 2A and 2B are diagrams illustrating a biasing structure and an assembly procedure of the lens holder according to the exemplary embodiment of the present disclosure.
Figure 2A:
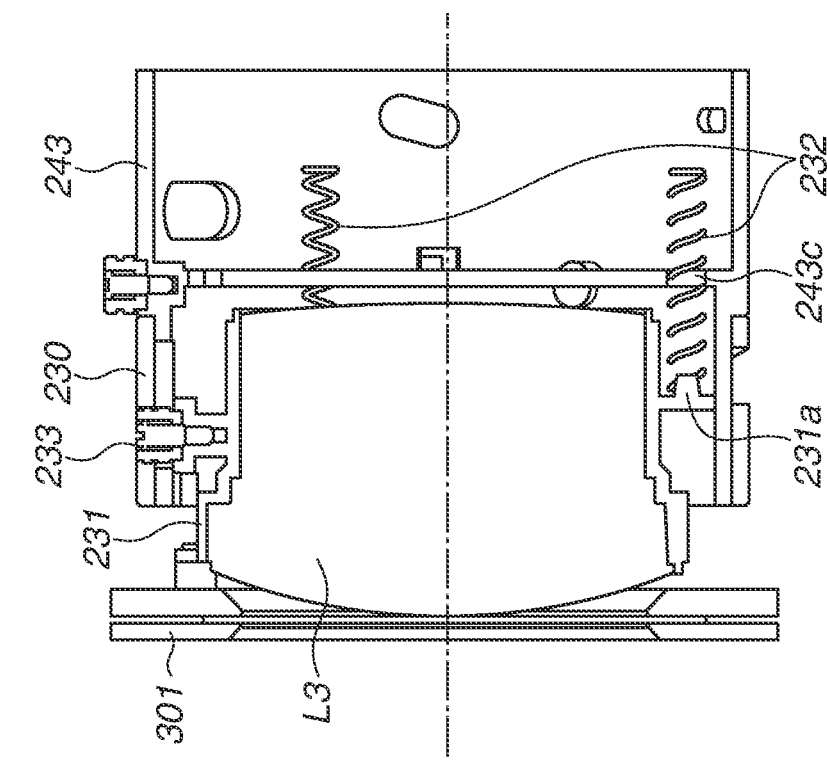

FIG. 2A is a cross-sectional view of FIG. 2B taken along line A-A, and FIG. 2B is a front view of a structure in the vicinity of the third lens unit L3, as seen from the optical axis direction. FIG. 3A is a cross-sectional view of FIG. 3B taken along line A-A and is a front view of the structure illustrated in FIG. 2A to which a pressing member 235 described below is added, as seen from the optical axis direction. FIG. 4A is a cross-sectional view of FIG. 4B taken along line A-A, and FIG. 4B is a front view of the structure illustrated in FIG. 3A in which the pressing member 235 is in contact with a pressing member receiving surface 243e, as seen from the optical axis direction. FIG. 5A is a cross-sectional view of FIG. 5B taken along line A-A, and FIG. 5B is a front view of the structure illustrated in FIG. 4A in which the pressing member 235 is rotated around the optical axis, as seen from the optical axis direction. FIG. 6A is a cross-sectional view of FIG. 6B taken along line A-A, and FIG. 6B is a front view of the structure illustrated in FIG. 5A to which the sub diaphragm 311 is added, as seen in the optical axis direction.

First, as illustrated in FIG. 2A, the third-unit holding frame 231 is inserted into the inside of the fourth-unit base 243 in a state where the fourth-unit base 243 and the third-unit cam barrel 230 are fitted to each other. Then, the third-unit rollers 233 are inserted into the third-unit holding frame 231 from the outside in the radial direction, and is screwed and fixed to the third-unit holding frame 231. As a result, the third-unit holding frame 231 is supported by the third-unit cam barrel 230 and the fourth-unit base 243.

Next, biasing springs 232 are inserted into biasing spring insertion holes 243c provided in the fourth-unit base 243. The front end of each of the biasing springs 232 is in contact with a biasing spring receiving portion 231a on the third-unit holding frame 231. Further, the three biasing springs 232 are equally spaced around the optical axis at approximately 120 degrees. The rear end of each of the biasing springs 232 is located rearward of the biasing spring insertion hole 243c in the natural length state. The structure illustrated in FIG. 2A is completed by the assembly procedure up to this point.

Next, as illustrated in FIG. 3A, the pressing member 235 is inserted into the fourth-unit base 243 from the rear side and is brought into contact with the rear ends of the biasing springs 232. In the state illustrated in FIG. 3A, the biasing springs 232 are not compressed. Then, as illustrated in FIG. 4A, the pressing member 235 is pushed forward against the reaction force of the biasing springs 232 and is brought into contact with the pressing member receiving surface 243e. The structure illustrated in FIG. 4A is completed by the assembly procedure up to this point.

Next, as illustrated in FIGS. 4B and 5B, the pressing member 235 is rotated clockwise on a plane orthogonal to the optical axis. As a result, bayonet claw portions 235a contact bayonet receiving portions (concave portions) 243f provided on the fourth-unit base 243, whereby the bayonet claw portions 235a are bayonet-locked. Accordingly, the rotational action of the pressing member 235 in the clockwise direction is regulated on the plane orthogonal to the optical axis. In this state, even if the pressing member 235 is pushed backward by the reaction force of the biasing springs 232, the backward movement of the pressing member 235 is regulated by the bayonet receiving portions 243f. In addition, the pressing member 235 has three pressing member through holes 235b provided at intervals of approximately 120 degrees. The pressing member receiving surface 243e has three fourth-unit base through holes 243g at intervals of approximately 120 degrees. While the bayonet claw portions 235a and the bayonet receiving portions 243f are bayonet-locked, the positions of the pressing member through holes 235b and the fourth-unit base through holes 243g substantially coincide with each other as seen in the optical axis direction. The structure illustrated in FIG. 5A is completed by the assembly procedure up to this point.

Next, as illustrated in FIGS. 6A and 6B, the sub diaphragm 311 is inserted into the fourth-unit base 243 from the rear side of the fourth-unit base 243. The sub diaphragm 311 has three sub diaphragm attachment portions 311b spaced around the optical axis at intervals of approximately 120 degrees. The sub diaphragm attachment portions 311b are inserted into the pressing member through holes 235b and the fourth-unit base through holes 243g. Then, a locking piece (locking claw portion) 311c provided at the tip of each of the sub diaphragm attachment portions (arm portions) 311b is locked to the fourth-unit base 243, whereby the sub diaphragm 311 is elastically coupled to the fourth-unit base 243.

In this way, the clockwise and counterclockwise rotations of the pressing member 235 are regulated with respect to the fourth-unit base 243 on the plane orthogonal to the optical axis. In the thus assembled structure around the third lens unit L3 and the fourth lens unit L4, the rotation of the pressing member 235 on the plane orthogonal to the optical axis is regulated even when an impact is applied due to vibration or dropping in the product state. Therefore, the torsion of the biasing springs 232 is suppressed, and the biasing springs 232 can suppress a change in the position of the third lens unit L3 with respect to the fourth-unit base 243.

Further, the biasing springs 232 remove back-lash between the rollers and the cam groove portions in the third lens unit L3 and the fourth lens unit L4. As described above, since the torsion of the biasing springs 232 is suppressed, the biasing springs 232 can stably perform biasing in the optical axis direction even if the orientation of the interchangeable lens 200 changes. This suppresses a decrease in optical performance due to changes in the amount and direction of back-lash resulting from an orientation change.

In the above assembly process, the pressing member 235 is used to push the biasing springs 232 in the optical axis direction. Therefore, the lenses or the electromagnetic diaphragm units are not touched by a worker or a tool, so that it is possible to prevent scratches and dirt on the lenses and damage to the electromagnetic diaphragm units, thereby facilitating the assembly work.

Advantageous Effects Obtained by Present Exemplary Embodiment

As described above, the interchangeable lens 200 according to the present exemplary embodiment includes the guide barrel having the third-unit guide groove portions 243d as straight advance guide grooves or the fourth-unit base 243 as a base member and the third-unit cam barrel 230 as a cam barrel having the third-unit cam groove portions 230a as cam groove portions. In addition, the interchangeable lens 200 includes the third-unit holding frame 231 as a lens holding member that supports the third lens unit L3 as a lens unit and has the third-unit rollers 233 as roller members inserted in the third-unit guide groove portions 243d and the third-unit cam groove portions 230a.

Further, the interchangeable lens 200 includes the sub diaphragm 311 as a first light amount adjustment unit, and the biasing springs 232 as biasing members for biasing the third-unit rollers 233 to the third-unit cam groove portions 230a. Furthermore, the interchangeable lens 200 includes the pressing member 235 that is supported between the sub diaphragm 311 and the third-unit holding frame 231 to press the biasing springs 232.

The sub diaphragm 311 includes the sub diaphragm attachment portions 311b as rotation regulating portions for regulating the rotation of the pressing member 235 around the optical axis of the third lens unit L3.

In the interchangeable lens 200, the biasing springs 232 bias the third-unit rollers 233 to the third-unit cam groove portions 230a, thereby making it possible to suppress a change in optical performance due to an orientation change of the interchangeable lens 200. Further, the sub diaphragm 311 includes the rotation regulating portion for regulating the rotation of the pressing member 235, which achieves size reduction as compared to a case in which a rotation regulating member for regulating the rotation of the pressing member 235 is newly provided in addition to the pressing member 235.

Other Advantageous Effects

As described above, the pressing member 235 has the bayonet claw portions 235a, and the fourth-unit base 243 has the bayonet receiving portions (concave portions) 243f that engage with the bayonet claw portions 235a. This suppresses a change in the position of the pressing member 235 in the optical axis direction.

Further, the sub diaphragm attachment portions 311b are arm portions each of which extends in the optical axis direction and has a locking piece (locking claw portion) 311c. The sub diaphragm attachment portions 311b pass through the pressing member through holes (first openings) 235b provided in the pressing member 235 and the fourth-unit base through holes (second openings) 243g provided in the fourth-unit base 243. Each of the locking pieces 311c engages with part of the fourth-unit base 243. Thus, the pressing member 235 is sandwiched between part of the fourth-unit base 243 and the sub diaphragm 311, thereby suppressing a change in the position of the pressing member 235 in the optical axis direction.

Since the sub diaphragm attachment portions 311b are flat spring-shaped elastic portions, the locking pieces 311c stably engage with part of the fourth-unit base 243, thereby suppressing a change in the position of the pressing member 235 in the optical axis direction.

Further, the third-unit holding frame 231 has the biasing spring receiving portions (attachment portions) 231a to which the biasing springs 232 are attached. The natural length of each of the biasing springs 232 is longer than the distance from the biasing spring receiving portion 231a to the pressing member 235 in the optical axis direction. The length of each of the biasing springs 232 at the time of maximum compression is shorter than the distance from the biasing spring receiving portion 231a to the pressing member 235 in the optical axis direction.

In other words, each of the biasing springs 232 is provided between the biasing spring receiving portion 231a and the pressing member 235 in a state longer than the length at the time of maximum compression. In this way, the biasing springs 232 can stably bias the third-unit rollers 233 to the third-unit cam groove portions 230a. In addition, even when an impact is applied to the interchangeable lens 200 in the optical axis direction, the biasing springs 232 can absorb the impact.

The interchangeable lens 200 includes the electromagnetic diaphragm unit (second light amount adjustment unit) 301 provided in the third-unit holding frame 231, in addition to the sub diaphragm (first light amount adjustment unit) 311. Thus, the interchangeable lens 200 can adjust the aperture value more finely by the two light amount adjustment units.

Modification Example

In the exemplary embodiment described above, a structure for biasing the third-unit rollers 233 to the third-unit cam groove portions 230a has been described. However, the configuration according to the exemplary embodiment may be applied to a structure in which roller members provided on a part other than the third-unit holding frame 231 are biased to the cam groove portions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-151366, filed Aug. 10, 2018, which is hereby incorporated by reference herein in its entirety.

What is claimed is:

1. A lens apparatus comprising:
   a base member including a rectilinear guide groove portion;
   a cam barrel including a cam groove portion;
   a lens holding member provided with a roller member inserted into the rectilinear guide groove portion and the cam groove portion and configured to support a lens unit;
   a first light amount adjustment unit;
   a biasing member configured to bias the roller member to the cam groove portion; and
   a pressing member configured to press the biasing member,
   wherein the first light amount adjustment unit includes a rotation regulating portion configured to regulate rotation of the pressing member around an optical axis of the lens unit,
   wherein the rotation regulating portion is an arm portion extending in a direction of the optical axis, the arm portion includes a locking claw portion which engages with the base member, and
   wherein the arm portion passes through a first opening provided in the pressing member and a second opening provided in the base member.

2. The lens apparatus according to claim 1,
   wherein the pressing member includes a bayonet claw portion, and
   wherein the base member includes a concave portion in which the bayonet claw portion engages.

3. The lens apparatus according to claim 1, wherein the rotation regulating portion is an elastic portion.

4. The lens apparatus according to claim 1,
   wherein the lens holding member includes an attachment portion to which the biasing member is attached,
   wherein a natural length of the biasing member is longer than a distance from the attachment portion to the pressing member in a direction of the optical axis, and
   wherein a length of the biasing member at a time of maximum compression is shorter than the distance from the attachment portion to the pressing member in the direction of the optical axis.

5. The lens apparatus according to claim 1, further comprising:
   a second light amount adjustment unit provided in the lens holding member.

6. An imaging apparatus comprising:
   a lens apparatus; and
   a camera body configured to hold an image sensor that receives light from the lens apparatus,
   wherein the lens apparatus includes:
   a base member including a rectilinear guide groove portion;
   a cam barrel including a cam groove portion;
   a lens holding member provided with a roller member inserted into the rectilinear guide groove portion and the cam groove portion and configured to support a lens unit;
   a first light amount adjustment unit;
   a biasing member configured to bias the roller member to the cam groove portion; and
   a pressing member configured to press the biasing member, and
   wherein the first light amount adjustment unit includes a rotation regulating portion for regulating rotation of the pressing member around an optical axis of the lens unit,
   wherein the rotation regulating portion is an arm portion extending in a direction of the optical axis, the arm portion includes a locking claw portion which engages with the base member, and
   wherein the arm portion passes through a first opening provided in the pressing member and a second opening provided in the base member.

* * * * *